United States Patent [19]

Giannuzzi et al.

[11] Patent Number: 4,948,308

[45] Date of Patent: Aug. 14, 1990

[54] AUTOMATED LIMITED ACCESS DRILLING SYSTEM

[75] Inventors: Ottavio Giannuzzi, Baldwin; Christopher J. Scheuing, Commack, both of N.Y.

[73] Assignee: Grumman Aerospace Corporation, Bethpage, N.Y.

[21] Appl. No.: 188,936

[22] Filed: May 2, 1988

[51] Int. Cl.[5] .......... B23B 47/18

[52] U.S. Cl. .......... 408/97; 408/111; 408/103; 408/138; 408/129

[58] Field of Search .......... 408/7, 67, 97, 103, 408/104, 105, 110, 111, 138, 146, 186, 107, 129, 151, 561, 184, 17, 96, 62, 64, 66; 83/454, 452, 34, 558, 556, 527, 50, 71, 446.1; 409/144; 901/6, 31, 37, 39; 414/740, 741; 269/87.3

[56] References Cited

U.S. PATENT DOCUMENTS

| | | | |
|---|---|---|---|
| 3,515,017 | 6/1970 | Ulrich | 408/103 |
| 3,533,614 | 10/1970 | Zetterlund | 269/14 |
| 3,888,362 | 6/1975 | Fletcher et al. | 414/620 |
| 3,945,676 | 3/1976 | Asamoto | 294/88 |
| 4,042,122 | 8/1977 | Espy et al. | 414/728 |
| 4,273,482 | 6/1981 | Lloyd et al. | 409/80 |
| 4,332,066 | 6/1982 | Hailey et al. | 29/26 R |
| 4,423,998 | 1/1984 | Inaba et al. | 414/730 |
| 4,480,170 | 10/1984 | Kondou et al. | 901/42 X |
| 4,885,836 | 12/1989 | Bonomi et al. | 29/524.1 |

*Primary Examiner*—Z. R. Bilinsky

*Attorney, Agent, or Firm*—Pollock, VandeSande & Priddy

[57] ABSTRACT

A drill tool is mounted to a robotic arm and is capable of operating in limited access space. The drill is driven by a motor shaft capable of exhibiting simultaneous linear and rotational motion. A right angle drill head is slidably mounted to a support and is driven by the motor shaft so that the drill bit moves toward a work piece while it rotates. A cylinder-driven clamp has its jaws coaxially aligned with a drill bit and is capable of clamping several pieces together, the latter constituting a work piece. One of the clamp jaws has a bushing which serves as both a drill guide and a clamp jaw.

6 Claims, 2 Drawing Sheets

AUTOMATED LIMITED ACCESS DRILLING SYSTEM

FIELD OF THE INVENTION

The present invention relates to automatic drill tools, and more particularly to such a tool capable of operating at the end of a robotic arm tool.

BACKGROUND OF THE INVENTION

In the assembly of various types of structural members, such as aircraft bulkheads and fuselages, rivet holes must be drilled through structural members in a space that offers little access for a drill tool. As a result, the construction of such bulkheads and fuselages is an extremely time-consuming task.

The increased utilization of robotics offers a more time-efficient possibility for drilling holes, but a problem still remains in the construction of a drill tool which may be introduced into the limited access space.

BRIEF DESCRIPTION OF THE INVENTION

The present invention offers a combination clamping and drilling tool that is adaptable to a robotic device. A clamping section of the tool holds structural members so that an ensuing drilling operation may be performed precisely with respect to the structural members.

The present invention is capable of operating in limited access space because there are provided right angle clamp and drill heads extending from the power unit of the tool. Accordingly, the drill and clamp heads may be introduced into the limited space while the powering units remain outside the space.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
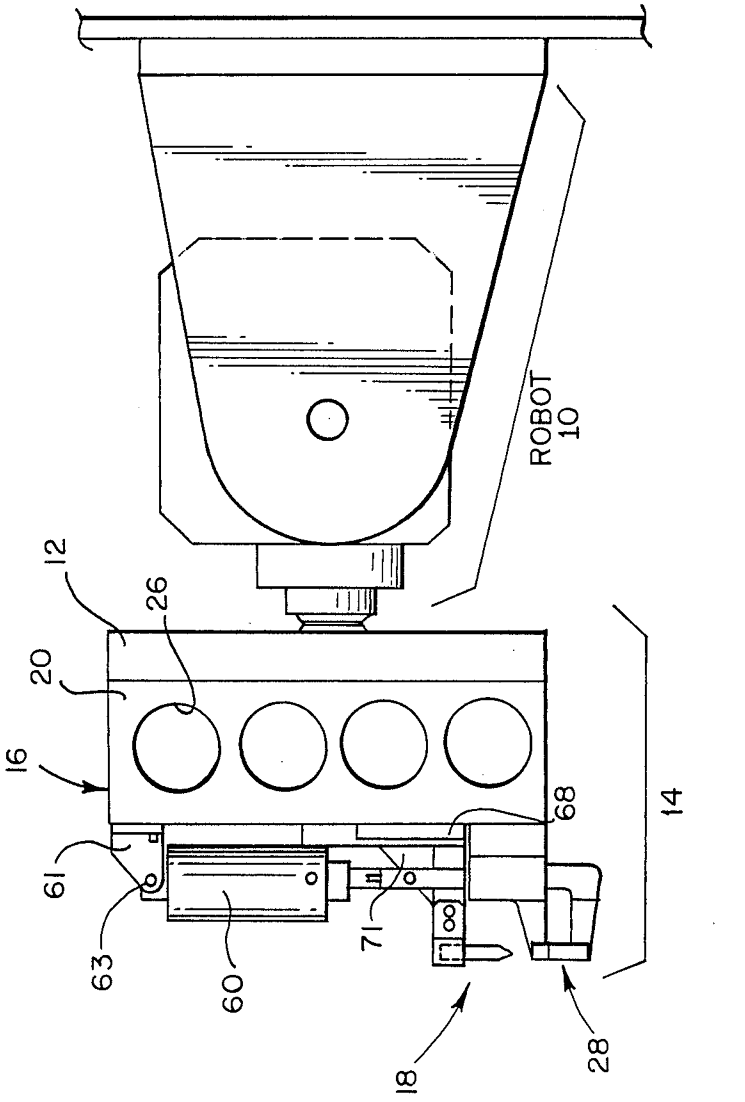
FIG. 1 is a top plan view of the present invention when installed on a robotic device.

FIG. 1 illustrates a top plan view of the present invention when mounted to the arm end of a robot 10. A plate 12 serves as an interface and manifold for the tool to be presently described. A channel-shaped member 16 acts as a base for the tool of the present invention, which is generally indicated by reference numeral 18. The combination of tool 18 and channel member 16 is collectively indicated by reference numeral 14.

Figure 2:
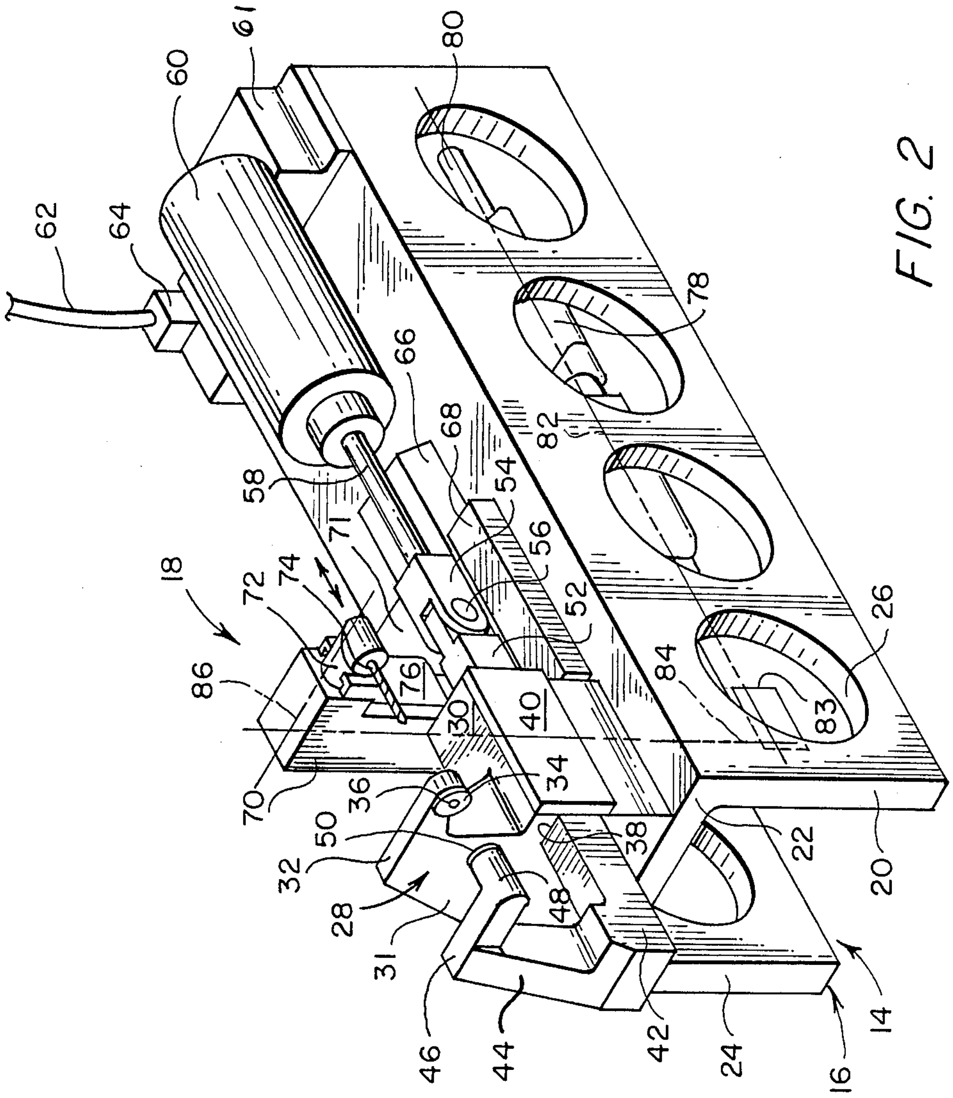
FIG. 2 is a perspective view of the present invention.

FIG. 2 illustrates the channel-shaped member 16 in greater detail. It is seen to include opposite parallel flanges 20 and 24 bridged by a bight section 22. Holes 26 are formed in the flanges 20 and 24 at regular longitudinal spacings for weight reduction.

A first aspect of the present tool relates to a pneumatically driven clamp, generally indicated by reference numeral 28. As shown in FIG. 2, the clamp aspect of the invention includes a journal block 30 having a stationary arm 31 extending perpendicularly outwardly from the channel-shaped member 16. An integral extension 32 of the stationary arm 31 is positioned in parallel overlying relation with the channel bight section 22 of the channel-shaped member 16. A bushing 34 is received in the outward facing end of the extension 32 and a bore 36 extends through the entire bushing. As viewed in FIG. 2, the left visible side of bushing 34 serves as a first clamp face while the opposite bushing side serves as a guide for drill bit 74 to be discussed shortly.

A movable clamp member includes a longitudinally extending bar section 42 which is received within a journal 38 formed in block 30. The bar section 42 and receiving journal 38 are preferably of a non-circular cross section so that alignment may be maintained between the fixed clamp face of bushing 34 and a mating movable clamp face 50. The latter-mentioned clamp face is supported by a right angle arm 46, 48, the arm being located in parallel overlying relationship with the confronting surface of bight section 22 of channel-shaped member 16. A generally vertically extending section 44 integrally extends from the bar section 42. A cover plate 40 provides access to the journal 38 so that bar section 42 may be assembled within the journal. The actuated end 52 of bar section 42 is received within a clevis 54, the latter being longitudinally moved by actuator 58 of a conventional pneumatic cylinder 60. The pivot connection 56 at clevis 54 accommodates minor flexing in the connection between actuator 58 and bar section 42 during movement. The housing of pneumatic cylinder 60 is secured to the channel-shaped member 16 by means of a pivot 63 (FIG. 1) which is secured within clevis 61, the latter being fixed to the bight section 22. The air cylinder is powered by an air supply line 62 which is anchored at an air connector 64, the latter being appropriately fastened to the channel-shaped member 16. The opposite end of the air supply line 62 passes to plate 12 where a manifold connection is provided (not shown) to the robot 10 in a conventional manner.

In a preferred embodiment of the invention, the tool 18 includes a housing 70 extending perpendicularly upwardly from the upper surface of channel bight section 22. The housing 70 is attached to a flange 71 which in turn perpendicularly extends from a dovetail slide 66. The slide 66 is contained between slide gibs 68, only one of which is visible in FIG. 2.

A right angle drill head 72 extends in parallel overlying relationship with a confronting surface of the bight section 22. A drill bit 74 is received within the right angle drill head and is positioned in coaxial relationship with the bushing 34 and clamp face 50.

When the dovetail slide 66 moves longitudinally, the housing 70 likewise moves causing the drill bit 74 to approach the bushing 34. When a work piece is clamped between the bushing 34 and clamp face 50, the drill is passed through the bushing 34 to a predetermined depth. A removable clamp 76 secures the drill head 72 in place and when removed it allows quick replacement of the drill head when necessary.

Located within the channel 16 is a self-feeding drill motor 78, such as manufactured by Rockwell Corporation and identified as Model 21D803. The shaft 80 of the motor undergoes rotational motion at the same time that it undergoes translational motion. The translational motion occurs along axis 82 indicated in FIG. 2. The motor is equipped with a right angle coupling 83 of conventional design, such as the coupling manufactured by the Rockwell Corporation and identified as Model 1021289. Such a right angle coupling produces rotational motion about the orthogonal axis 84 (FIG. 2). A right angle drive which may use, for example, conventional bevel gears, translates the rotational motion from axis 84 to axis 86. A final right angle drive within the drill head 72 finally translates the rotational motion to drill bit 74. Accordingly, motor 78 accomplishes rotational motion of drill bit 74 while it also drives the drill bit 74 into and away from a work piece to a preset depth. The preset depth for the drill bit 74, as well as its speed of rotation, may be controlled by a conventional robot controller which completes an automatic cycle for the tool as follows:

After a work piece is positioned between bushing 34 and clamp face 50, robot controller controls the pneumatic pressure for cylinder 60 to achieve clamping movement and predetermined clamping pressure of the clamp face 50 relative to the bushing 34. During clamping, motor 78 moves the drill bit 74 through the bushing 34 and into a clamped work piece by a preset depth. After the drill reaches this preset depth, it will be automatically retracted, allowing the work piece to be unclamped. The automatic cycle for the tool may be begun when a robot 10 moves the tool into engagement with the work piece to complete a drilling operation. At the end of this operation, the robot may simply be withdrawn from the work piece, ready for a repetition of this automatic cycle. It should be pointed out that drill bit 74 may be a simple drill bit or a compound conventional bit which will perform both drilling and countersinking operations in one step.

In the assembly of bulk heads and fuselages, the work piece is often comprised of a number of structural members. Due to the offset relationship between the motor and the drill-clamp units, the latter combination is able to perform in limited access spaces, such as between the stiffeners and panels of bulkheads and fuselages.

It should be understood that the invention is not limited to the exact details of construction shown and described herein for obvious modifications will occur to persons skilled in the art.

We claim:

1. An offset drilling tool comprising:

a main support member;

slide means secured to the member for sliding relative to the support member;

a drill housing mounted to the slide means;

a right angle drill head extending from the drill housing for receiving a drill bit;

motor means mounted to the support member and having a shaft for undergoing simultaneous rotational and linear motions;

a plurality of interconnected right angle drive means passing through the housing and connected at a first end thereof to the drill head; and means connected between a second end of the drive means and the shaft for coupling linear motion to the drill housing and simultaneous rotation to the drill head resulting in linear motion of the drill bit toward and away from a work piece while the bit rotates.

2. 2. The structure set forth in claim 1 together with a clamping assembly comprising:

a first clamp arm having an outward end thereof receiving a bushing with a first end serving as a guide for the drill bit, the bushing having an opposite end including a jaw surface for contacting a work piece surface;

a second clamp arm which is movable relative to the first arm and having a jaw surface aligned with the jaw surface of the first arm for contacting a second work piece surface; and means connected to the support member for moving one clamp arm relative to the other in a direction coaxial with the movement of the drill bit.

3. The structure set forth in claim 2 wherein the slide means is a dovetail slide.

4. The structure set forth in claim 2 wherein the means for moving the clamp arm comprises:

cylinder means having a movable actuator; and means coupling the actuator to the movable clamp arm.

5. A drilling tool for connection to a robotic arm, the tool comprising:

a support member;

a dovetail slide secured to the member for sliding relative to the support member;

a drill housing mounted perpendicularly to the slide;

a right angle drill head extending from the drill housing in parallel relationship to the support member for receiving a drill bit;

a motor mounted to the support member and having a shaft for undergoing simultaneous rotational and linear motion;

a plurality of interconnected right angle drive means passing through the housing and connected at a first end thereon to the drill head;

means connected between a second end of the drive means and the shaft for coupling linear motion to the drill housing and simultaneous rotation to the drill head resulting in linear motion of a drill bit toward and away from a work piece while the bit rotates; and a clamping assembly comprising:

a first stationary clamp arm having an outward end thereof receiving a bushing with a first end serving as a guide for the drill bit, the bushing having an opposite end including a jaw surface for contacting a first work piece surface;

a second clamp arm which is movable relative to the first arm and having a jaw surface aligned with the jaw surface of the stationary arm for contacting a second work piece surface;

a pneumatic cylinder having a reciprocatable actuator; and means coupling the actuator to the movable clamp arm.

6. The structure set forth in claim 5 together with means for interfacing the tool to a robotic arm.

* * * * *